United States Patent
Oud et al.

(10) Patent No.: US 6,193,131 B1
(45) Date of Patent: Feb. 27, 2001

(54) SOLDER SLEEVE AND A METHOD FOR THE FORMING THEREOF

(75) Inventors: Martinus Adrianus Oud, Krimpen A/D Ijssel; Paul Willem Godijn, Huizen; Antonius Johannes Welling, Naarden; Willem Velthuizen, Leersum, all of (NL)

(73) Assignee: Witmetaal B.V., Naarden (NL)

( * ) Notice: Subject to any disclaimer, the term of this patent is extended or adjusted under 35 U.S.C. 154(b) by 0 days.

(21) Appl. No.: 09/077,680
(22) PCT Filed: Dec. 4, 1996
(86) PCT No.: PCT/NL96/00476
　§ 371 Date: Jul. 30, 1998
　§ 102(e) Date: Jul. 30, 1998
(87) PCT Pub. No.: WO97/20655
　PCT Pub. Date: Jun. 12, 1997

(30) Foreign Application Priority Data

Dec. 4, 1995 (NL) .................................................... 1001809

(51) Int. Cl.⁷ ........................... B23K 35/14; B23K 31/02; B21D 39/00
(52) U.S. Cl. ...................... 228/56.3; 228/164; 228/171
(58) Field of Search .................................. 228/135, 136, 228/56.3, 133, 164, 171, 224

(56) References Cited

U.S. PATENT DOCUMENTS

| | | |
|---|---|---|
| 2,503,564 | 4/1950 | Reeve . |
| 3,239,125 | 3/1966 | Sherlock . |
| 3,268,248 * | 8/1966 | Chambers ............................ 285/286 |
| 3,290,772 * | 12/1966 | Crouch .................................... 29/493 |
| 3,427,707 | 2/1969 | Nowosadko . |
| 3,877,249 * | 4/1975 | Sager ........................................ 63/15 |
| 4,448,343 * | 5/1984 | Kochka et al. ....................... 228/205 |
| 5,257,715 * | 11/1993 | Jackel et al. .......................... 228/135 |
| 5,505,365 * | 4/1996 | Olsen ................................... 228/135 |

FOREIGN PATENT DOCUMENTS

| | | |
|---|---|---|
| 48577 | 4/1938 | (FR) . |
| 3310 | of 1915 | (GB) . |
| 659355 | 10/1951 | (GB) . |

OTHER PUBLICATIONS

Patent Abstracts of Japan, vol. 9, No. 282 (M–428) for JP 60 124491, Jul. 3, 1985, 1 page.

Olson, H., "How to Design for Preform Brazing", Welding Engineer, Sep. 1960, pp. 36–39.

* cited by examiner

*Primary Examiner*—Patrick Ryan
*Assistant Examiner*—Zidia T. Pittman
(74) *Attorney, Agent, or Firm*—Webb Ziesenheim Logsdon Orkin & Hanson, P.C.

(57) ABSTRACT

The invention relates to a solder sleeve comprising a split sleeve of solder material having end surfaces of which take the form of form-fitting coupling elements, and to a method for forming such a solder sleeve, comprising of: i) providing a strip of solder material having end surfaces of which take the form of form-fitting coupling elements; and ii) bending the strip to form a sleeve, wherein the coupling elements mutually engage for coupling.

7 Claims, 1 Drawing Sheet

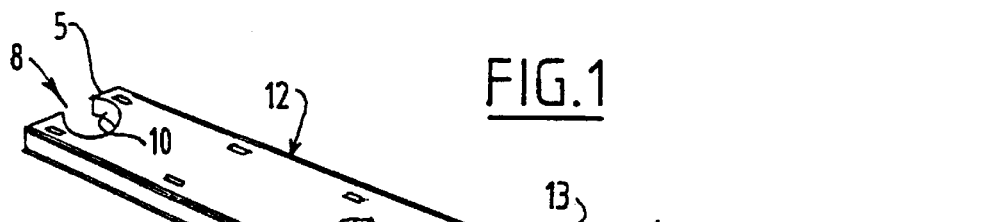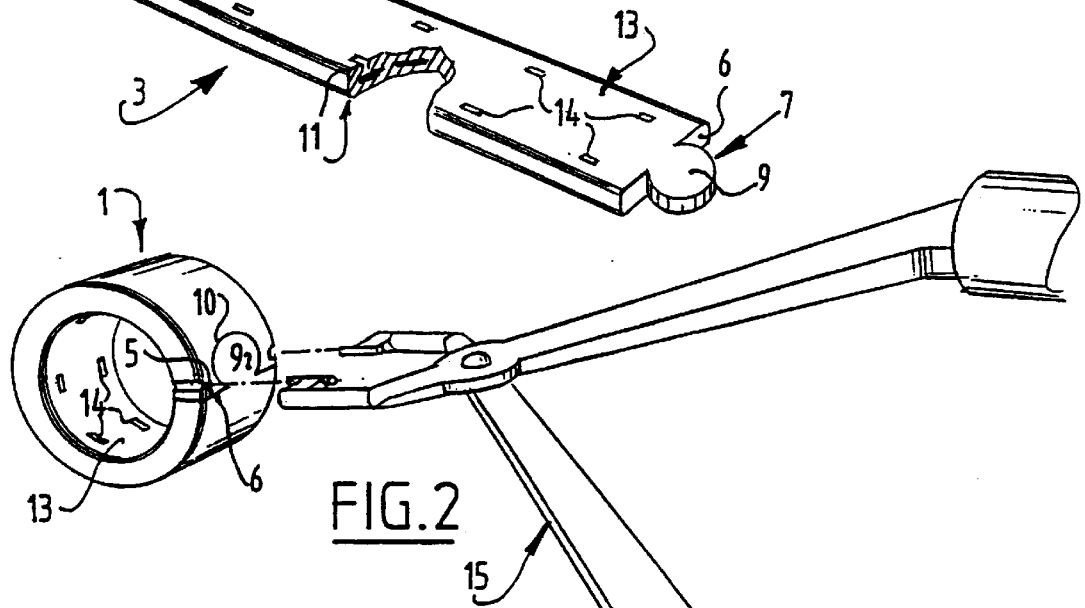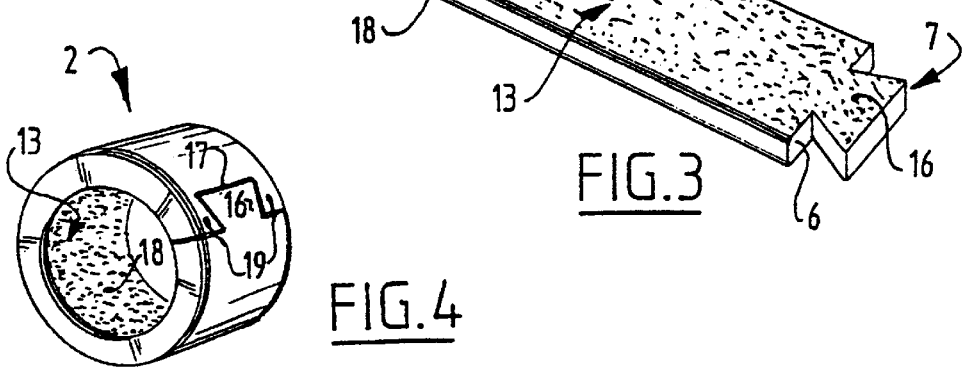

SOLDER SLEEVE AND A METHOD FOR THE FORMING THEREOF

BACKGROUND OF THE INVENTION a) Field of the Invention

The present invention relates to a solder sleeve and to a method for forming such a solder sleeve.

b) Description of the Related Art

In the soldering of objects, particularly wires and cables, so-called solder sleeves can be used. Such solder sleeves are pushed over the objects to the place requiring soldering, whereafter the solder sleeve is softened by supplying heat and the soldered connection is realized.

Solder sleeves have been manufactured heretofore by deep-drawing from a length of solder material a cup-shaped bulge from which a cylinder is subsequently cut and the remaining material is melted down to once again form a length of solder material. Such a method is expensive, while the manufactured solder sleeves may have burrs on the sleeve edges as a result of the cutting whereby sliding of such a solder sleeve along and over the object is made difficult or impossible.

SUMMARY OF THE INVENTION

The present invention has for its object to provide a solder sleeve which substantially does not have the above stated drawbacks. This is achieved according to the invention in that the solder sleeve comprises a split sleeve of solder material having end surfaces of which take the form of form-fitting coupling elements. By making use of form-fitting coupling elements of solder material at the position of the end surfaces, strips can be punched from a length of solder material which can subsequently be bent round so that there remains substantially no solder material which must be fed back for re-use after melting down. It has been found that such a solder sleeve can be manufactured unexpectedly well within narrow tolerances and retains its form, this as a result of the residual stresses which are present.

Many kinds of known form-fitting shapes can be used as coupling elements, such as coupling elements comprising a female element and a male element complementary thereto. Such coupling elements preferably lock against a mutual displacement in the axial as well as the peripheral direction.

In order to easily perform the subsequent soldering it is further recommended that the internal surface of the sleeve is provided with at least one opening for delivering flux material. It is thus possible to release flux material locally and at the right position during the soldering process. It is however apparent that the solder sleeve can likewise be provided with flux material on its internal and optionally its external surface.

Because the solder sleeve is manufactured from a strip which is punched from a length of solder material, it is possible to form the length such that its longitudinal edges are rounded, whereby the sleeve also has rounded edges. This provides the advantage that no stagnation occurs during sliding of the sleeve over and along the objects.

The present invention also relates to a method for forming a solder sleeve, comprising of:

i) providing a strip of solder material having end surfaces which take the form of form-fitting coupling elements; and ii) bending the strip to form a sleeve, wherein the coupling elements mutually engage for coupling.

In further preference the sleeve is deformed close to a transition of the coupling elements. Thus is avoided that the coupling elements move apart since deformation of material occurs at the position of the transition between the coupling elements. Use is hereby made of the deformability of known solder material.

Mentioned and other features will be further elucidated hereinbelow on the basis of two embodiments which are given by way of example without the invention being deemed limited hereto, wherein reference is made to the annexed drawing.

BRIEF DESCRIPTION OF THE DRAWINGS

In the drawing:

FIGS. 1 and 3 each show a perspective view of a strip of solder material; and

FIGS. 2 and 4 each show a perspective view of the solder sleeves according to the invention formed from the solder material strips shown in FIGS. 1 and 3.

DETAILED DESCRIPTION OF THE INVENTION

Solder strip 3 is punched from a length of solder material (not shown), this such that the end surfaces 5 and 6 are provided with co-acting, form-fitting coupling elements 7 and 8.

Coupling element 7 takes the form of a disc part 9 and coupling element 8 has a recess 10 complementary to disc part 9.

FIG. 1 further shows clearly that the edges 11 and 12 of solder strip 3 are rounded off.

In order to form the solder sleeve 1 the solder strip 3 is bent round to form the sleeve shown in FIG. 2, wherein coupling elements 9 and 10 mutually engage in form-fitting manner so that solder sleeve 1 has equal quantities of solder material in axial and peripheral direction.

The internal surface 13 of sleeve 1 is provided with a plurality of apertures 14 from which flux material present in the solder material can flow outward at the beginning of the soldering process.

In order to ensure that the solder sleeve retains the formed sleeve shape, it is possible using the tool 15 shown in FIG. 2 to apply a deformation locally at the position of the interface between the end surfaces 5 and 6, whereby coupling elements 7 and 8 can no longer move apart.

FIG. 4 shows another solder sleeve 2 according to the invention which is manufactured from the solder strip 4 shown in FIG. 3.

The end surfaces 5 and 6 are likewise provided with coupling elements 7 and 8 which in this case take the form of a dovetail-shaped part 16 and a recess 17 complementary thereto. The solder strip 4 is further covered on one side with a coating 18 of flux material whereby the internal surface 13 of sleeve 2 is likewise provided with flux material 18.

It is further possible using a centre point at the position of the points 19 to arrange deformations once again at the position of the transition between coupling elements 16 and 17, whereby undesirable moving apart is avoided.

It will be apparent that the solder sleeves are manufactured from any typical solder material such as tin or lead. Any known type of flux material can moreover be used such as the flux material.

It will be apparent to any skilled person that any type of solder material and flux material can be used as long as they do not interfere with the forming of solder material strips and the formation therefrom of solder sleeves according to the invention.

What is claimed is:

1. A solder sleeve comprising a strip of solder material having two end surfaces, wherein the strip forms a split sleeve and wherein the end surfaces take the form of form-fitting coupling elements.

2. The solder sleeve as claimed in claim 1, wherein the coupling elements comprise a female element and a male element.

3. The solder sleeve as claimed in claim 1, wherein the coupling elements lock against a mutual displacement in axial and peripheral direction.

4. The solder sleeve as claimed in claim 1, wherein the internal surface of the sleeve is provided with at least one opening for delivering flux material.

5. The solder sleeve as claimed in claim 1, wherein the edges of the sleeve are rounded.

6. A method for forming a solder sleeve, comprising the steps of:

i) providing a strip of solder material having end surfaces which take the form of form-fitting coupling elements; and ii) bending the strip to form a sleeve, wherein the coupling elements mutually engage for coupling.

7. The method as claimed in claim 6 wherein the sleeve is deformed close to a transition of the coupling elements.

* * * * *